(12) United States Patent
Gomez et al.

(10) Patent No.: US 8,061,646 B2
(45) Date of Patent: Nov. 22, 2011

(54) WING TIP DOCKING SYSTEM FOR AIRCRAFT

(75) Inventors: Martin L. Gomez, Fairfax, VA (US); Robert Parks, San Jose, CA (US); Adam J. Woodworth, Melrose, MA (US)

(73) Assignee: Aurora Flight Sciences Corporation, Manassas, VA (US)

(*) Notice: Subject to any disclaimer, the term of this patent is extended or adjusted under 35 U.S.C. 154(b) by 666 days.

(21) Appl. No.: 12/210,711

(22) Filed: Sep. 15, 2008

(65) Prior Publication Data
US 2009/0127376 A1    May 21, 2009

Related U.S. Application Data

(60) Provisional application No. 60/972,707, filed on Sep. 14, 2007.

(51) Int. Cl.
*B64C 37/02* (2006.01)
*B64C 23/06* (2006.01)
*B64D 5/00* (2006.01)

(52) U.S. Cl. .................... 244/2; 244/1 TD; 244/199.3

(58) Field of Classification Search .............. 244/2, 3, 244/1 TD, 199.1, 199.2, 199.3, 201, 130
See application file for complete search history.

(56) References Cited

U.S. PATENT DOCUMENTS

| | | | |
|---|---|---|---|
| 1,048,835 A | 12/1912 | Hyde et al. | |
| 1,881,034 A | 10/1932 | Smith et al. | |
| D144,067 S | 3/1946 | Paglia | |
| 2,643,076 A | 6/1953 | Hurel | |
| 2,809,792 A * | 10/1957 | Hohmann | 244/3 |
| 2,863,618 A * | 12/1958 | Doyle et al. | 244/2 |
| 2,936,966 A * | 5/1960 | Vogt | 244/2 |
| 2,969,933 A * | 1/1961 | Vogt | 244/2 |
| 3,025,027 A | 3/1962 | Ferreira | |
| 3,089,670 A | 5/1963 | Johnson | |
| 3,161,373 A * | 12/1964 | Vogt | 244/2 |
| 3,226,056 A * | 12/1965 | Holland, Jr. | 244/2 |
| 3,249,322 A * | 5/1966 | Holland, Jr. | 244/3 |
| 4,262,864 A | 4/1981 | Eshoo | |
| 4,361,295 A | 11/1982 | Wenzel | |
| 4,364,532 A | 12/1982 | Stark | |
| 4,415,133 A | 11/1983 | Phillips | |

(Continued)

OTHER PUBLICATIONS

"A Preliminary Study of Solar Powered Aircraft and Associated Power Trains: NASA Contract Report 3699"; David W. Hall, et al.; Dec. 1983; see pp. 118-124. "Study of the Aerodynamics of a Small UAV Using AVL Software"; Paul Dorfman; Apr. 24, 2006.

(Continued)

*Primary Examiner* — Timothy D Collins
*Assistant Examiner* — Steven Hawk
(74) *Attorney, Agent, or Firm* — Katten Muchin Rosenman LLP

(57) ABSTRACT

A system and method for docking various types of aircraft is disclosed. An aerodynamic lifting structure docking mechanism for docking two or more aircraft is provided comprising an aerodynamic lifting structure. The aerodynamic lifting structure includes a first and second airflow adjustment mechanism. The aerodynamic lifting structure further includes a first hard docking mechanism, and a second hard docking mechanism, and still further includes a soft docking mechanism. The first and second airflow adjustment mechanisms are configured to substantially remove any aerodynamic lifting structure vortices around each of the aerodynamic lifting structure tip areas. The soft docking mechanism is configured to soft dock a first aerodynamic lifting structure with a second aerodynamic lifting structure. The first hard docking mechanism is configured to hard dock with the second hard docking mechanism, thereby temporarily attaching the first aerodynamic lifting structure with the second aerodynamic lifting structure.

12 Claims, 12 Drawing Sheets

U.S. PATENT DOCUMENTS 5,810,284 A        9/1998  Hibbs et al.
6,641,082 B2 *   11/2003  Bevilaqua et al. ............... 244/2
7,198,225 B2      4/2007  Lisoski et al.
7,789,339 B2 *    9/2010  Sommer ........................... 244/3

OTHER PUBLICATIONS

"Gust Load Conditions for Fatigue Tests Based on a Continuous Gust Concept"; J.B. de Jonge, et al., Jan. 13, 1997.

* cited by examiner

WING TIP DOCKING SYSTEM FOR AIRCRAFT

PRIORITY

This application claims the benefit of priority under 35 U.S.C. §119(e) from U.S. Provisional Application Ser. No. 60/972,707, entitled "Wingtip Docking System for Aircraft", filed on Sep. 14, 2007, the entire contents of which are incorporated herein by reference.

BACKGROUND OF THE INVENTION

1. Field of the Invention

The invention relates to docking of aircraft. More particularly, the invention relates to a system and method for docking aerodynamic lifting structures of different aircraft together at the tips of the respective aerodynamic lifting structures.

2. Background Art

Coupling aircraft together at their respective wing tips has long been recognized by those of ordinary skill in the art as providing several unique advantages for various mission scenarios. Previous attempts to couple aircraft, however, have been challenging and have often met in disaster. One prior art example attempted to couple fighter aircraft to a bomber at their wing tips in order to provide combat air support when the bomber was delivering their payload. In that ill-fated attempt, a defective autopilot caused the fighter aircraft to flip over and collide with the bomber, with subsequent loss of life and aircraft.

Regardless of the relative size of the two or more aircraft that are attempting to dock via their wing tips, the wing tip vortices that exist substantially prevent the two (or more) aircraft from approaching each other in a stable manner; the vortices from a first aircraft will affect the stability of the second aircraft if the second one gets too close to the wing tip area, and visa versa. FIG. 7 illustrates wing tip vortices generated at the wing tip areas of two aircraft. Under these conditions, i.e., with wing tip vortices, docking two (or more) aircraft at their wing tips becomes very difficult.

Thus, a need exists for a system and method to dock aerodynamic lifting structures of different aircraft together at the tips of the respective aerodynamic lifting structures.

SUMMARY OF THE INVENTION

It is therefore a general aspect of the invention to provide a system and method for docking aerodynamic lifting structures of different aircraft together at the tips of the respective aerodynamic lifting structures that will obviate or minimize problems of the type previously described.

According to a first aspect of the present invention, an aerodynamic lifting structure docking mechanism for docking together two or more aircraft is provided, comprising: an aerodynamic lifting structure, wherein the aerodynamic lifting structure includes a first end area and a second end area, a first airflow adjustment mechanism and a second airflow adjustment mechanism, wherein the first airflow adjustment mechanism is located at the first end area of the aerodynamic lifting structure, and the second airflow adjustment mechanism is located at the second end area of the aerodynamic lifting structure, a first hard docking mechanism, wherein the first hard docking mechanism is located at a tip area of the first end area of the aerodynamic lifting structure, and a second hard docking mechanism, wherein the second hard docking mechanism is located at a tip of the second end area of the aerodynamic lifting structure, and wherein, the first airflow adjustment mechanism and the second airflow adjustment mechanism are configured to substantially move any aerodynamic lifting structure air vortices existing around each of the aerodynamic lifting structure tip areas away from each respective aerodynamic lifting structure tip area, and further wherein the first hard docking mechanism and the second hard docking mechanism are configured to hard dock with each other, thereby docking a first aerodynamic lifting structure of a first aircraft with a second aerodynamic lifting structure of a second aircraft.

According to the first aspect, the aerodynamic lifting structure further comprises: a soft docking mechanism, wherein the soft docking mechanism is located at the first hard docking mechanism, and further wherein the soft docking mechanism is configured to soft dock the first aerodynamic lifting structure with the second aerodynamic lifting structure when the first aerodynamic lifting structure and the second aerodynamic lifting structure are within a predetermined distance of each other.

According to the first aspect, the soft docking mechanism is further configured to be extendable and retractable, and further wherein the soft docking mechanism comprises a boom assembly.

According to the first aspect, the predetermined distance is less than or about the length of the first aircraft; further still the predetermined distance is less than or about the length of the first aerodynamic lifting structure of the first aircraft; and furthermore the predetermined distance is less than or about half the length of the first aerodynamic lifting structure of the first aircraft.

According to the first aspect the aerodynamic lifting structure comprises: a first wing on a first side of a fuselage of the aircraft; and a second wing on a second side of the fuselage. Still further according to the first aspect, the aerodynamic lifting structure comprises a mono wing aircraft, with no fuselage separating the wing structure.

According to the first aspect, the first airflow adjustment mechanism is configured to alter a surface configuration of the first end area of the aerodynamic lifting structure, and is thereby further configured to alter airflow over the first end area, and the second airflow adjustment mechanism is configured to alter a surface configuration of the second end area of the aerodynamic lifting structure, and is thereby further configured to alter airflow over the second end area. According to the first aspect, the aircraft is a solar powered aircraft.

According to the first aspect, the first hard docking mechanism includes a gripper portion, and the second hard docking mechanism includes a controllable piston portion and a flexible rod, and wherein, the controllable piston portion is configured to extend the flexible rod from the first aerodynamic lifting structure towards the gripper portion, and the gripper portion is configured to grip the flexible rod, and the controllable piston portion is further configured to retract the gripped flexible rod, thereby hard docking the first aircraft with the second aircraft.

According to a second aspect of the present invention, a method is provided for docking together two or more aircraft, each aircraft comprising an aerodynamic lifting structure with a first end and a second end, the method comprising the steps of: moving the first aircraft and the second aircraft such that the second end of a first aerodynamic lifting structure of the first aircraft and the first end of the second aerodynamic lifting structure are within a first predetermined distance of each other; substantially reducing air vortices located at the second end of the first aerodynamic lifting structure of the first aircraft; substantially reducing air vortices located at the first end of the second aerodynamic lifting structure of the second aircraft; and hard docking the first aircraft with the second aircraft.

According to the second aspect, the method further comprises soft docking the first aircraft to the second aircraft. According to the second aspect, the step of soft docking the first aircraft to the second aircraft comprises: extending a soft docking mechanism from the second end of the first aerodynamic lifting structure of the first aircraft; engaging the first end of the second aerodynamic lifting structure of the second aircraft with the soft docking mechanism; and retracting the soft docking mechanism into the second end of the first aerodynamic lifting structure of the first aircraft thereby moving the first and second aircraft closer together. According to the second aspect, the soft docking mechanism comprises a boom assembly.

According to the second aspect, the step of substantially reducing air vortices comprises: substantially reducing or eliminating lift at tips of each of the aerodynamic lifting structures. According to the second aspect, the step of substantially reducing or eliminating lift at tips of each of the aerodynamic lifting structures comprises: altering an airflow configuration in the tip area of each of the aerodynamic lifting structures. According to the second aspect, the step of altering an airflow configuration in a tip area of each of the aerodynamic lifting structures comprises: moving an airflow adjustment mechanism to alter the airflow over each of the aerodynamic lifting structures. According to the second aspect, the airflow adjustment mechanism comprises a flap, aileron, and/or flaperon.

According to the second aspect, the step of hard docking the first aircraft with the second aircraft comprises: moving the first aircraft close enough to the second aircraft such that a first hard docking mechanism located at the second tip of the first aerodynamic lifting structure of the first aircraft can engage and removably attach itself to a second hard docking mechanism located at the first tip of the second aerodynamic lifting structure of the second aircraft; and engaging the first hard docking mechanism with the second hard docking mechanism.

According to the second aspect, the first hard docking mechanism includes a gripper portion, and the second hard docking mechanism includes a controllable piston portion and a flexible rod, wherein, the controllable piston portion is configured to extend the flexible rod from the first aerodynamic lifting structure towards the gripper portion, and the gripper portion is configured to grip the flexible rod, and the controllable piston portion is further configured to retract the gripped flexible rod, thereby hard docking the first aircraft with the second aircraft.

According to a third aspect of the present invention, an aircraft is provided, comprising: a soft docking system configured to soft dock a first aircraft with a second aircraft; and a hard docking system configured to hard dock the first aircraft with the second aircraft. According to the third aspect, the aircraft further comprises an aerodynamic lifting structure; a first airflow adjustment mechanism located at a first end of the aerodynamic lifting structure; and a second airflow adjustment mechanism located at a second end of the aerodynamic lifting structure, wherein a first airflow adjustment mechanism of the first aircraft is adjusted to substantially reduce air vortices at the first end of the first aerodynamic lifting structure, and a second airflow adjustment mechanism of the second aircraft is adjusted to substantially reduce vortices at the second end of the first aerodynamic lifting structure prior to soft docking of the first aircraft to the second aircraft.

According to the third aspect, the hard docking system further comprises: a first hard docking mechanism located at the first end of the aerodynamic lifting structure; and a second hard docking mechanism located at the second end of the aerodynamic lifting structure, wherein the first hard docking mechanism of the first aircraft is configured to engage and removably attach to the second hard docking mechanism of the second aircraft, following soft docking and when the first and second aircraft are located at or less than a first predetermined distance.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

Figure 1:
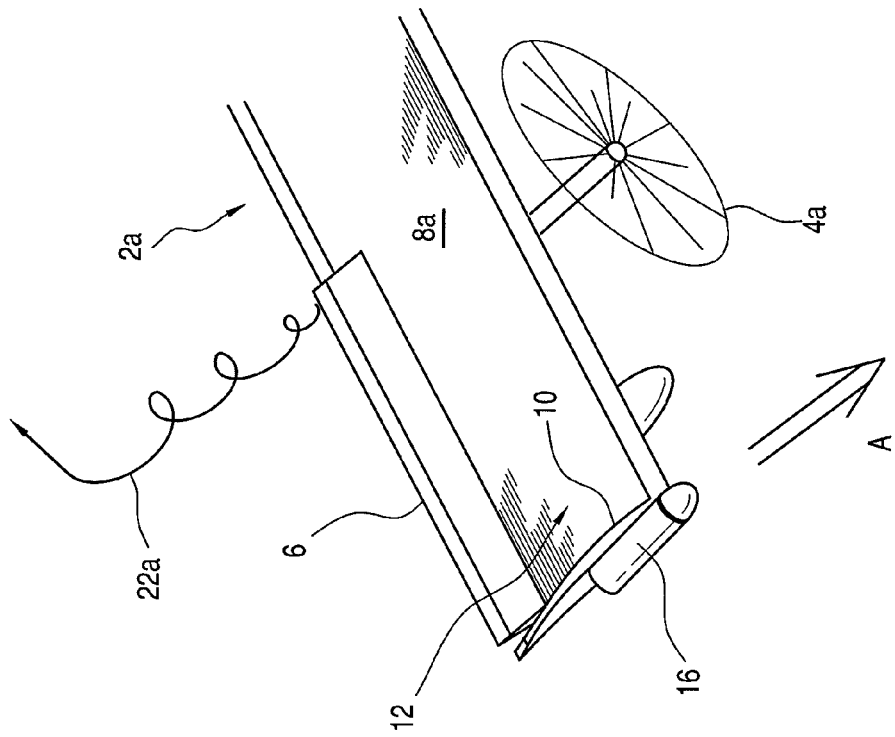
FIG. 1 illustrates a first wing panel tip of a first modular constituent unmanned aerial vehicle and a second wing panel tip of a second modular constituent unmanned aerial vehicle according to an embodiment of the present invention.
Figure 1:
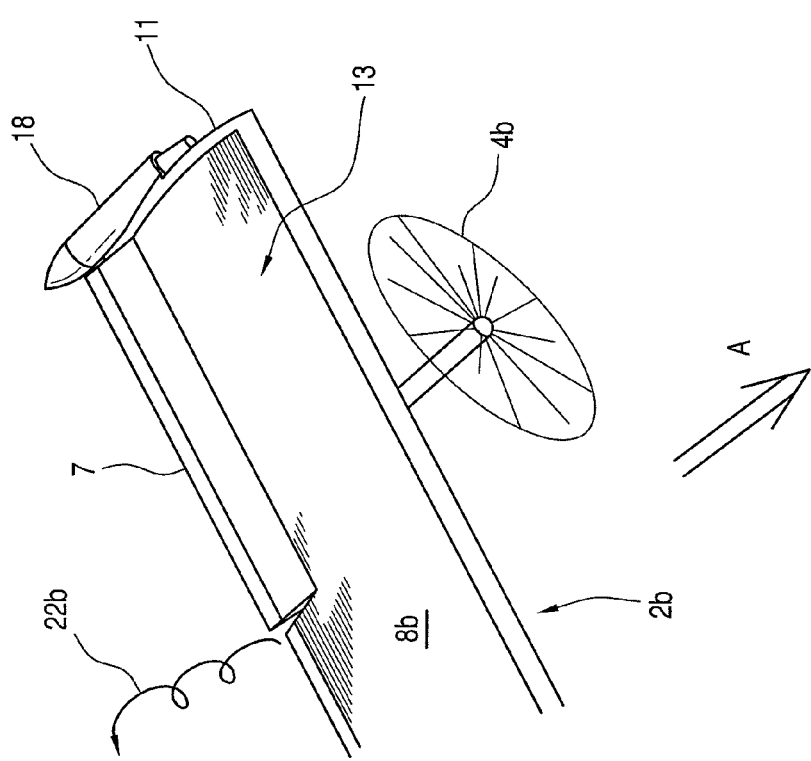

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

I. Introduction.

According to an exemplary embodiment, any type of aircraft can be coupled together at their wingtips by substantially eliminating or reducing wingtip vortices at the wing tips of both aircraft as they are being coupled together. According to a preferred embodiment, the wingtip vortices can be substantially removed or eliminated by adjusting the airfoil shape or configuration at the wingtip area to substantially reduce or eliminate lift at the wingtips. As those of ordinary skill in the art can appreciate, wingtip vortices are generated by the generation of lift at the wingtip areas. By temporarily removing or substantially reducing the lift near the wing tip (by altering the airfoil configuration), the wingtip vortices are also substantially moved towards the center of each wing and away from the tip area. A soft docking mechanism (in an exemplary embodiment, a boom assembly or a drogue on a flexible cable) can then join the two aircraft together and then the rear aircraft can fly up to and hard dock with the front aircraft, or conversely, the soft docking mechanism can draw in ("reel in") the second (or aft) aircraft to the first (fore) aircraft. According to still a further exemplary embodiment, the soft docking mechanism is eliminated and a hard docking mechanism is provided that hard docks the wingtips when they are adjacent to each other.

II. Wingtip Docking Mechanism and Method

According to exemplary embodiments, the wingtip docking mechanism and method can work on substantially all types of aircraft. Thus, the discussion below should not be construed to be limited to any one particular type of aircraft. By way of example only, and according to a preferred embodiment of the present invention, discussion is made of light, unmanned aerial vehicles. Thus, according to exemplary embodiments, the wingtip docking mechanism can be used with substantially all types of manned aircraft, both civilian, military, spacecraft, homebuilt, among others. More particularly, and according to a preferred embodiment, the discussion below refers to solar powered modular constituent unmanned aerial vehicles (MC UAVs). The UAVs are referred to as "modular constituent" because they are designed to be fit together via the docking system and method described herein, and are generally and substantially identical. As those of ordinary skill in the present art can appreciate, however, even though each UAV can comprise the appropriate hardware components to allow wingtip docking, the UAV's themselves can be of different shapes, sizes, and with different payloads and capabilities, yet still can accomplish wingtip docking according to exemplary embodiments.

Figure 8:
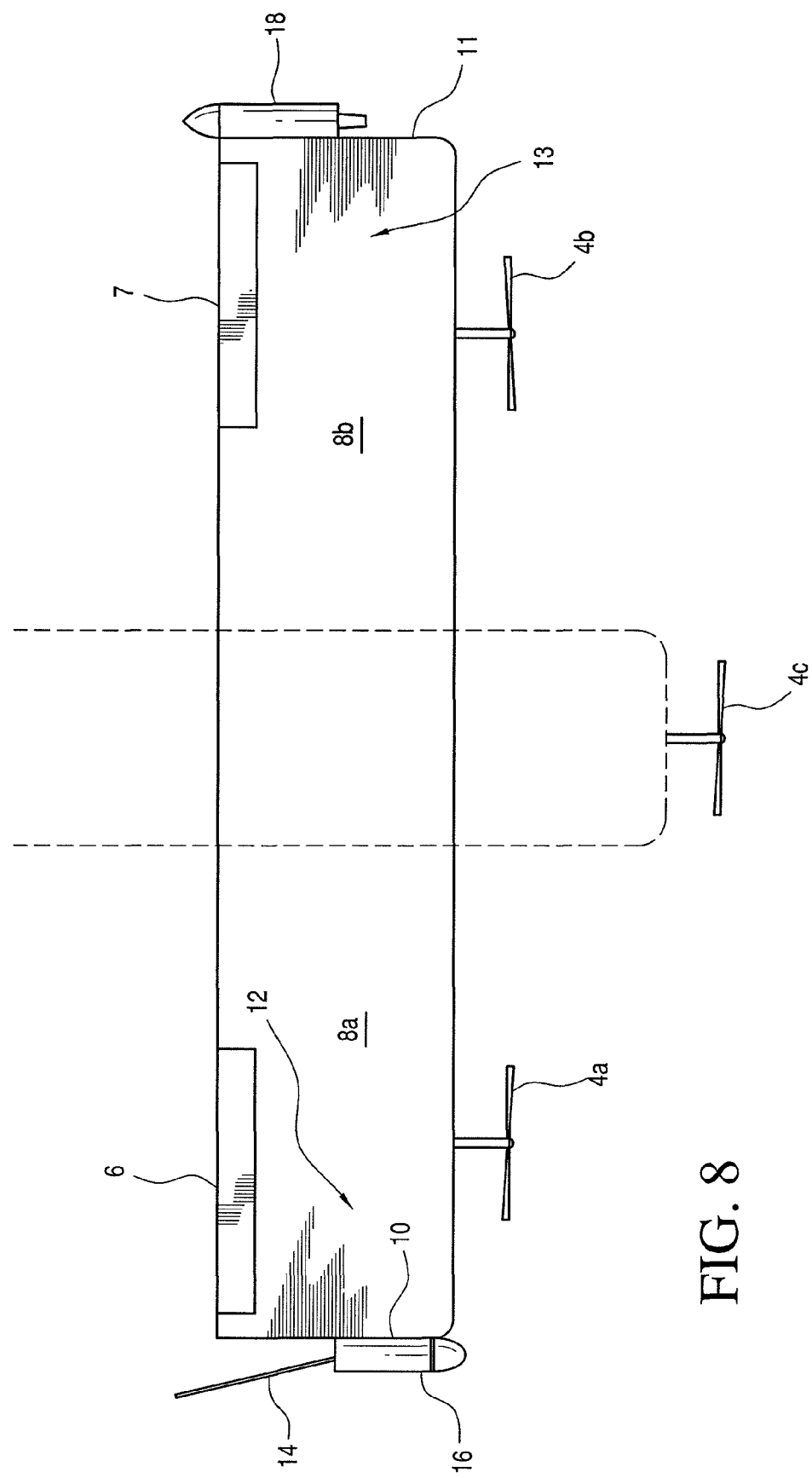
FIG. 8 illustrates a top view of a modular constituent unmanned aerial vehicle according to an embodiment of the present invention.

FIG. 1 illustrates a first wing panel tip area 12 of a first modular constituent unmanned aerial vehicle (MC UAV) 2a and a second wing panel tip area 13 of a second modular constituent unmanned aerial vehicle 2b according to an embodiment of the present invention. According to this exemplary embodiment, each MC UAV 2 comprises substantially identical components: a propulsion unit 4; first airflow adjustment mechanism 6; second airflow adjustment mechanism 7; wing panel 8; first wing panel tip 10; second wing panel tip 11; first wing panel tip area 12, second wing panel tip area 13; soft docking mechanism 14 (shown in FIGS. 2-4, and 8); first hard docking mechanism 16; and second hard docking mechanism 18. FIG. 8 illustrates a top view of MC UAV 2. As those of ordinary skill in the art can appreciate, the number and/or placement of propulsion units 4 can vary. Similarly, other well known aircraft control structures (flaps, landing gear, antenna, pay load bays, among other items) have been omitted for the purpose of clarity.

Figure 7:
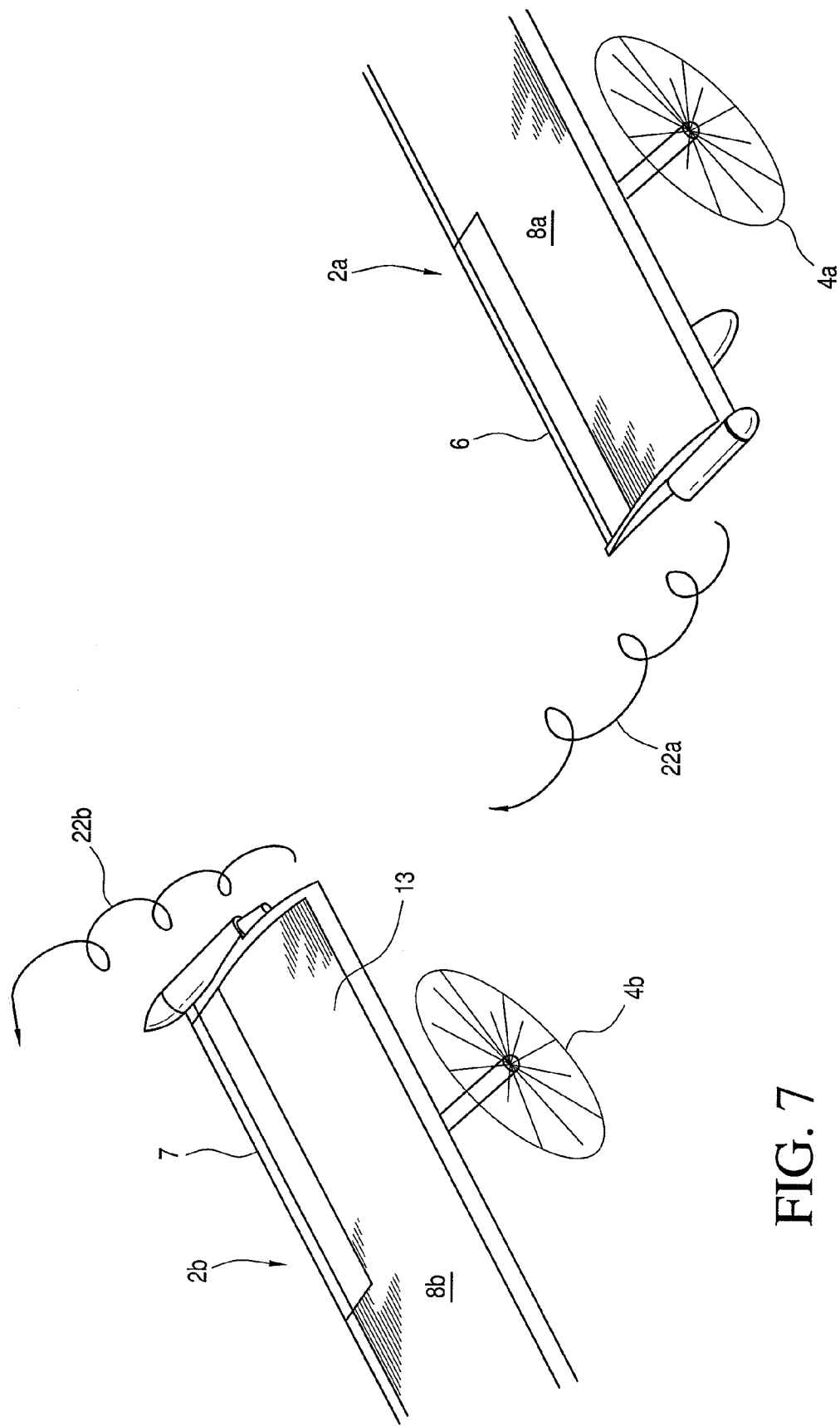
FIG. 7 illustrates wing tip vortices generated at wing tips of a first and second aircraft.

As shown in FIG. 1, both MC UAV's 2a, b are moving in direction of arrows A, at substantially the same altitude, attitude, and velocity. According to an exemplary embodiment, both MC UAV 2a, b can be computer controlled and operated in a master-slave configuration such that each MC UAV is operated in substantially the same way. In normal flight, wingtip air vortices are generated because of the lift generated over the wing at the wing panel tip areas 12, 13, shown as vortices 22 in FIG. 7. Vortices 22 can substantially negatively affect the stability of another aircraft that encounters the vortices if the second aircraft flies too close to the wing tips of the first aircraft (and visa-versa). According to an exemplary embodiment of the present invention, MC UAVs 2a, b are substantially identical, and in FIG. 1, a right side of wing panel 8a is shown and a left side of wing panel; 8b is shown. At the moment in time that FIG. 1 represents, both MC UAVs 2a, b have adjusted their respective outer airflow adjustment mechanisms 6, 7 in order to substantially reduce or eliminate lift, thereby substantially reducing or eliminating wingtip air vortices over and around wing panel tip areas 12, 13. The air vortices will now be shed from the inboard end of the airflow adjustment mechanisms.

Figure 2:
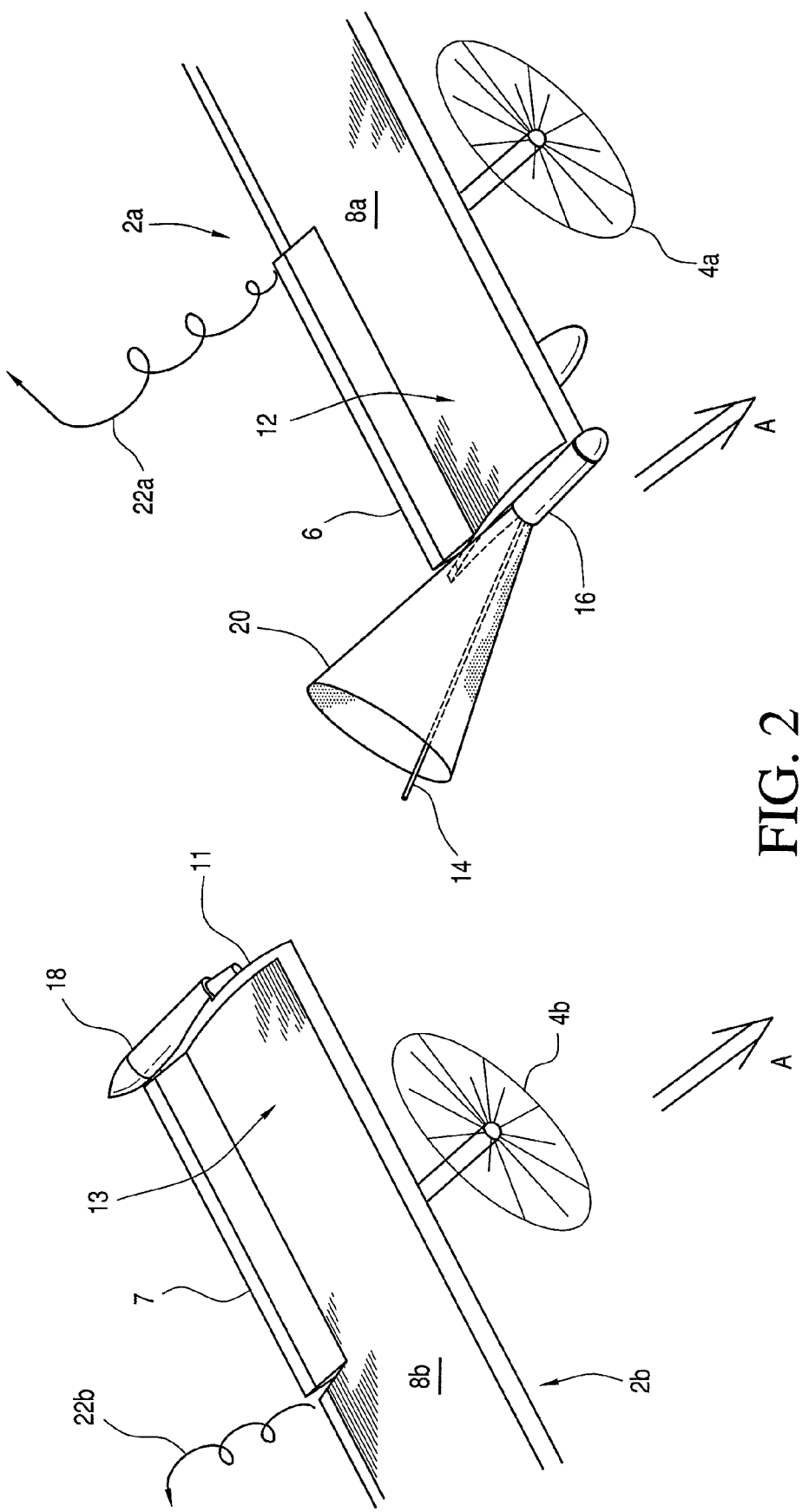
FIG. 2 illustrates a soft docking mechanism from a first hard docking mechanism on the first modular constituent unmanned aerial vehicle as it is extended towards a second hard docking mechanism on the second modular constituent unmanned aerial vehicle according to an embodiment of the present invention.

FIG. 2 illustrates soft docking mechanism 14 from first hard docking mechanism 16 on MC UAV 2a as it is extended towards second hard docking mechanism 18 on MC UAV 2b according to an exemplary embodiment. Because the wingtip air vortices have been substantially reduced or eliminated, wing panels 8a, b can now approach each other with substantially reduced or no possibility of collision and/or disruption of normal flight. Soft docking mechanism 14, which can consist of an extendable/retractable boom or a drogue on a flexible cable, extends out rearwardly from first hard docking mechanism 16. Shown in FIG. 2 is soft docking area cone 20, which illustrates the cone shaped volume of space that second hard docking mechanism 18 on MC UAV 2b can occupy and still soft dock with MC UAV 2a. If soft docking mechanism 14 were allowed to couple with second hard docking mechanism 18 outside of soft docking area cone 20, then breakage of soft docking mechanism 14 could occur and the difficulty of hard docking the two MC UAVs together increases substantially. Soft docking mechanism 14 allows MC UAV 2a to temporarily couple with MC UAV 2b and allow hard docking to occur in a much easier fashion.

During this process, the aircraft (MC UAVs 8a, 8b) can be each controlled by their own flight computers. In this case, the forward aircraft would likely be the "master" and would attempt to maintain straight and level flight, while the aft aircraft, the "slave", would maneuver to close with and dock with the master aircraft. The flight computers could share information by a radio or laser link (among other methods and systems for transmitting information). Optical sensors could also measure the relative positions of the two aircraft. In an alternate configuration, one aircraft flight computer could take direct control over both aircraft, and jointly maneuver them into position. In this case, the master aircraft flight computer would send low level commands, such as servo positions to the other aircraft.

According to an alternative embodiment, soft docking mechanism 14 can also extend out forwardly from second hard docking mechanism 18 to first hard docking mechanism 16. In that instance, soft docking area cone 20 as shown in FIG. 2 would extend forwardly from second MC UAV 2b; the ensuing description of how soft docking and hard docking occurs is then substantially the same, with the exception of the origin of soft docking mechanism 14.

Figure 3:
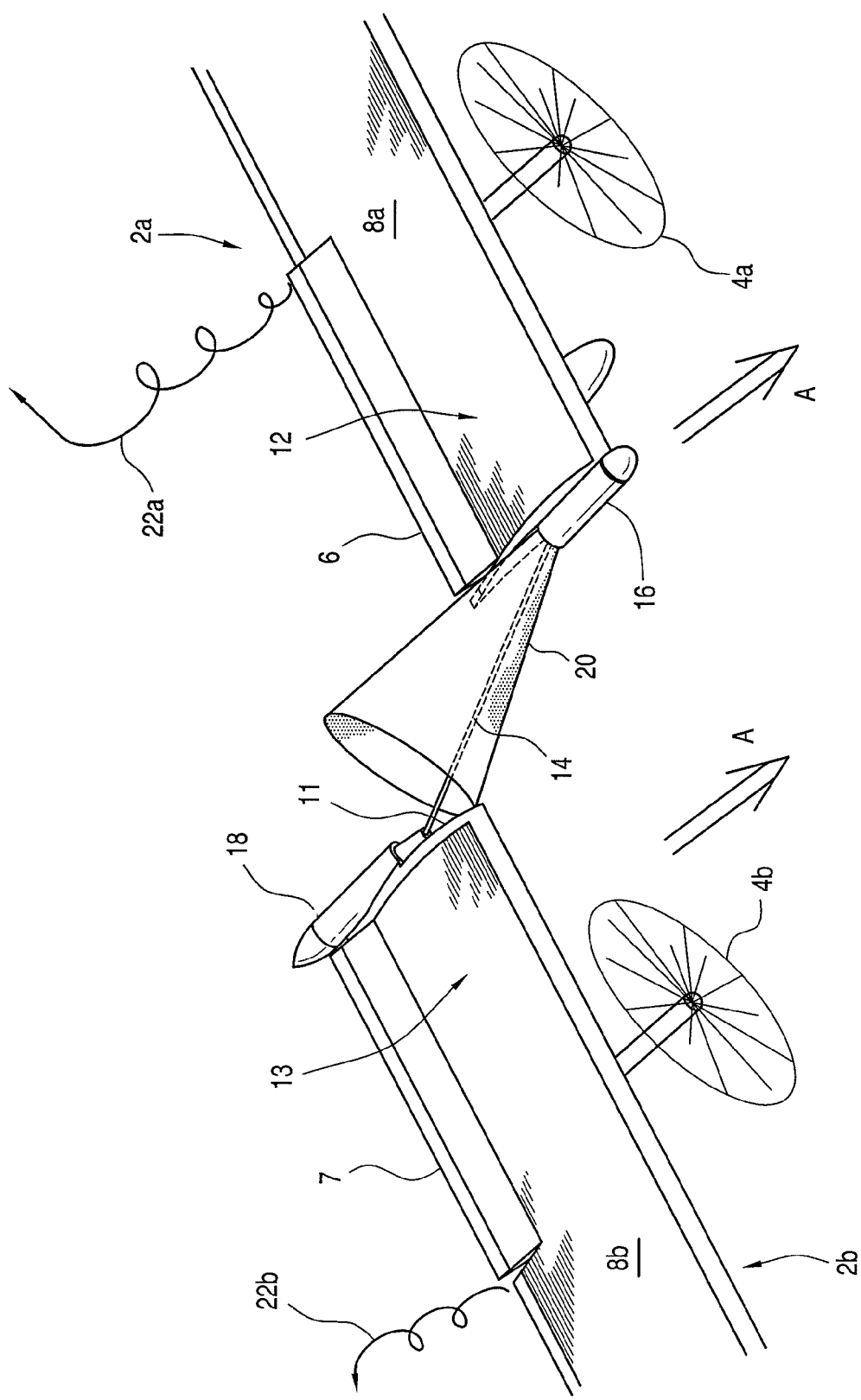
FIG. 3 illustrates the soft docking mechanism from the first hard docking mechanism on the first modular constituent unmanned aerial vehicle as it is coupled with the second hard docking mechanism on the second modular constituent unmanned aerial vehicle according to an embodiment of the present invention.

FIG. 3 illustrates soft docking mechanism 14 extended from first hard docking mechanism 16 on first MC UAV 2a and coupled with second hard docking mechanism 18 on MC UAV 2b according to an embodiment of the present invention. According to an exemplary embodiment of the present invention, MC UAV 2b will travel forward to MC UAV 2a to hard dock with MC UAV 2a. Those of ordinary skill in the art of the present invention can appreciate, however, that MC UAV 2a can alternatively slow down to allow either or both soft and hard docking to occur. Soft docking mechanism 14 can alternatively reel in or draw in second (aft) MC UAV 2b to first (fore) MC UAV 2a.

Figure 4:
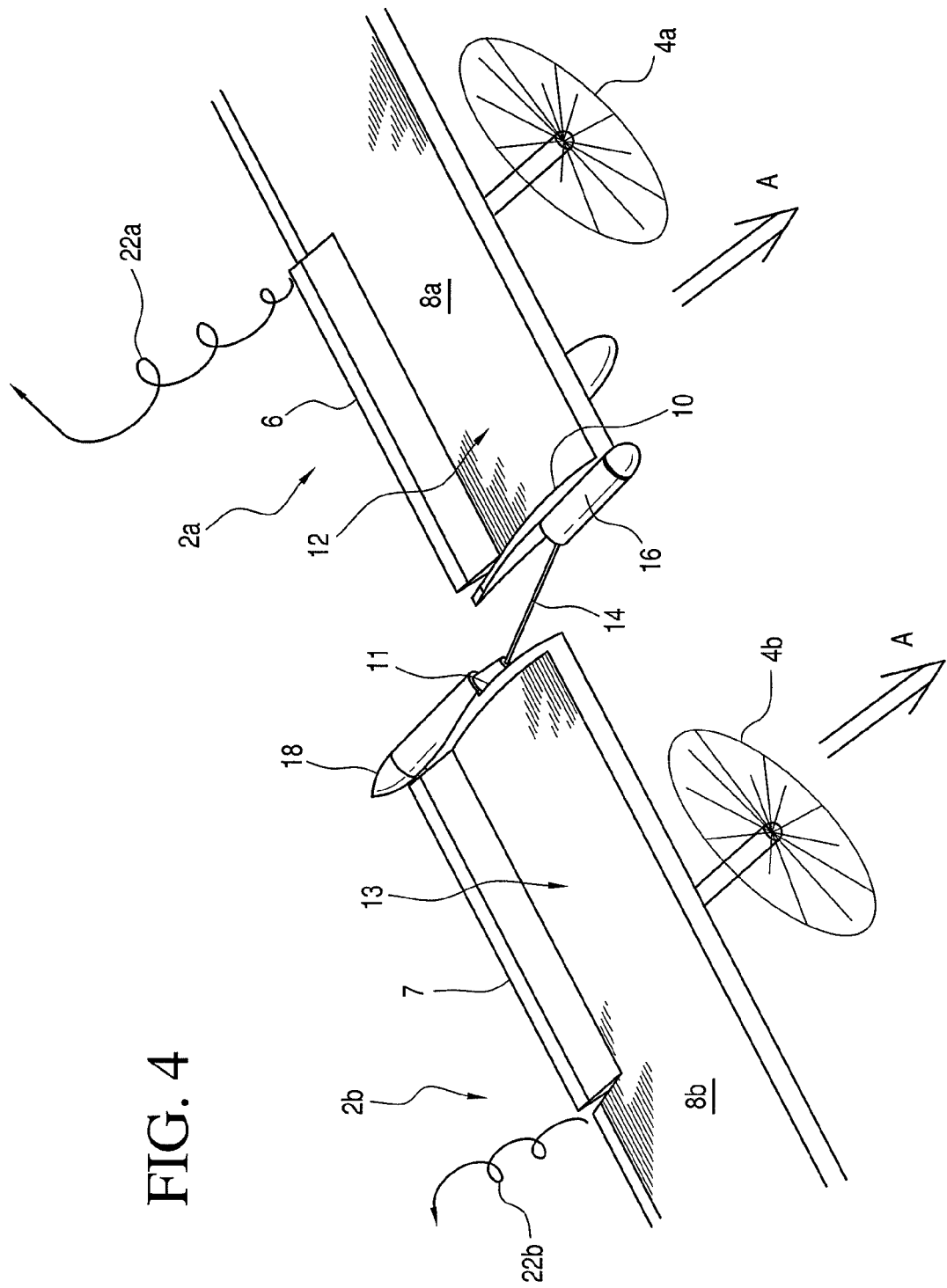
FIG. 4 illustrates the second modular constituent unmanned aerial vehicle as it uses the soft docking mechanism to move closer to the first constituent unmanned aerial vehicle to perform a hard docking maneuver according to an embodiment of the present invention.

MC UAVs 2a, b are soft docked together when soft docking mechanism 14 couples with second hard docking mechanism 18, which contains a receptacle means for removably (or temporarily) coupling with soft docking mechanism 14. According to an exemplary embodiment, MC UAV 2b will now slowly increase its speed, and soft docking mechanism will assist in drawing MC UAV 2a, b together such that hard docking can occur. FIG. 4 illustrates MC UAV 2b as it uses soft docking mechanism 14 to move closer to MC UAV 2a to perform a hard docking maneuver according to an exemplary embodiment of the present invention.

Figure 5:
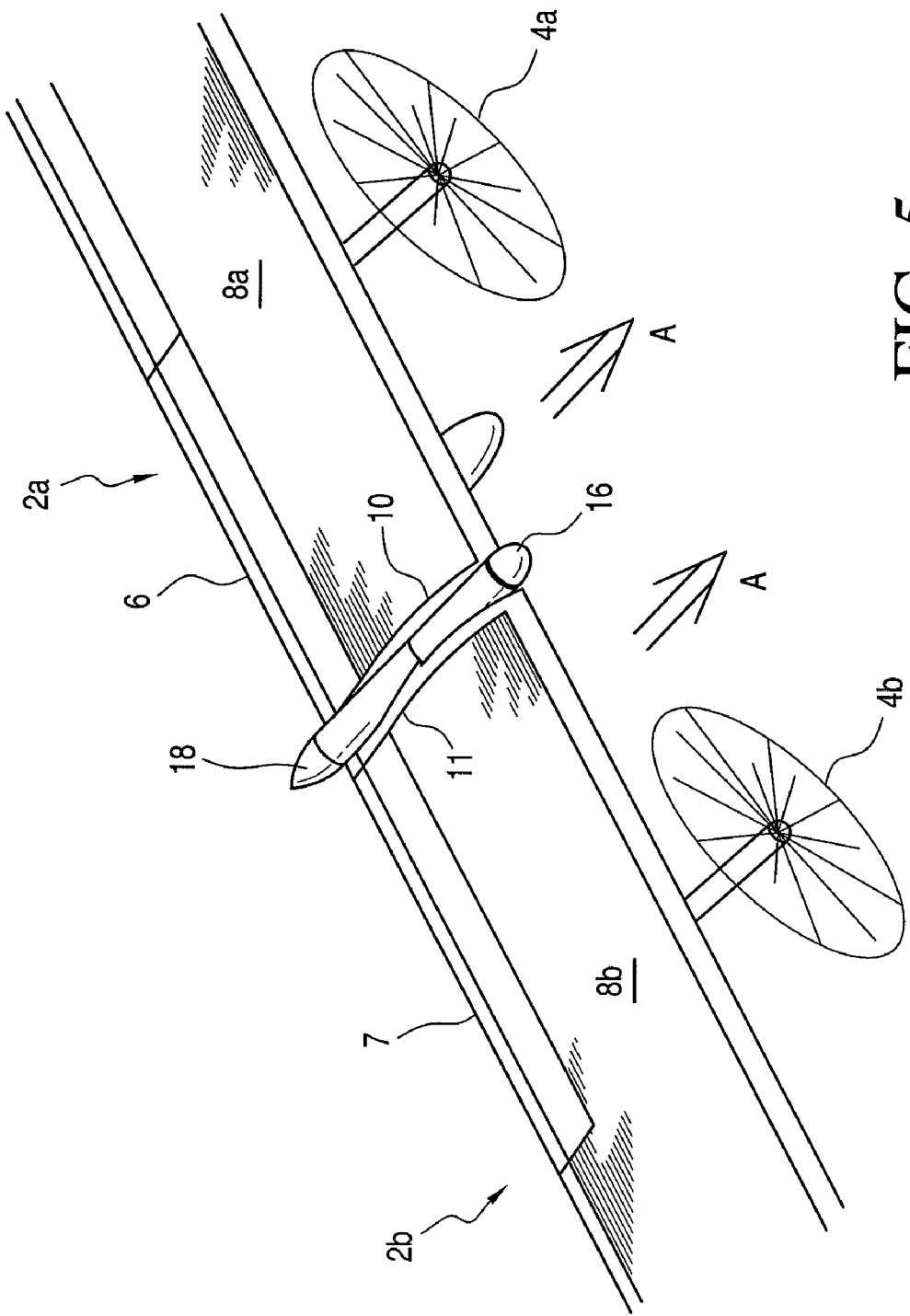
FIG. 5 illustrates the first and second modular constituent unmanned aerial vehicles after they have completed the hard docking maneuver and the first hard docking mechanism on the first modular constituent unmanned aerial vehicle is coupled with the second hard docking mechanism on the second modular constituent unmanned aerial vehicle according to an embodiment of the present invention.

FIG. 5 illustrates MC UAVs 2a, b after they have completed the hard docking maneuver and first hard docking mechanism 16 on MC UAV 2a is coupled with second hard docking mechanism 18 on MC UAV 2b according to an exemplary embodiment. Soft docking mechanism 14 allows MC UAV 2a to move toward and couple with MC UAV 2b; as the two MC UAV 2a, b move towards each other, soft docking mechanism 14 slowly retracts into first hard docking mechanism 16, bringing first wing panel tip 10 together with second wing panel tip 11, thereby bringing first hard docking mechanism 16 together with second hard docking mechanism 18. First and second hard docking mechanisms 16, 18 couple together, providing a secure coupling between the two wing panels 8a, b. According to an exemplary, first and second docking mechanisms 16, 18 can also allow wing panels 8a, b to rotate and form an angle between the two wing panels 8a, b.

Figure 9:
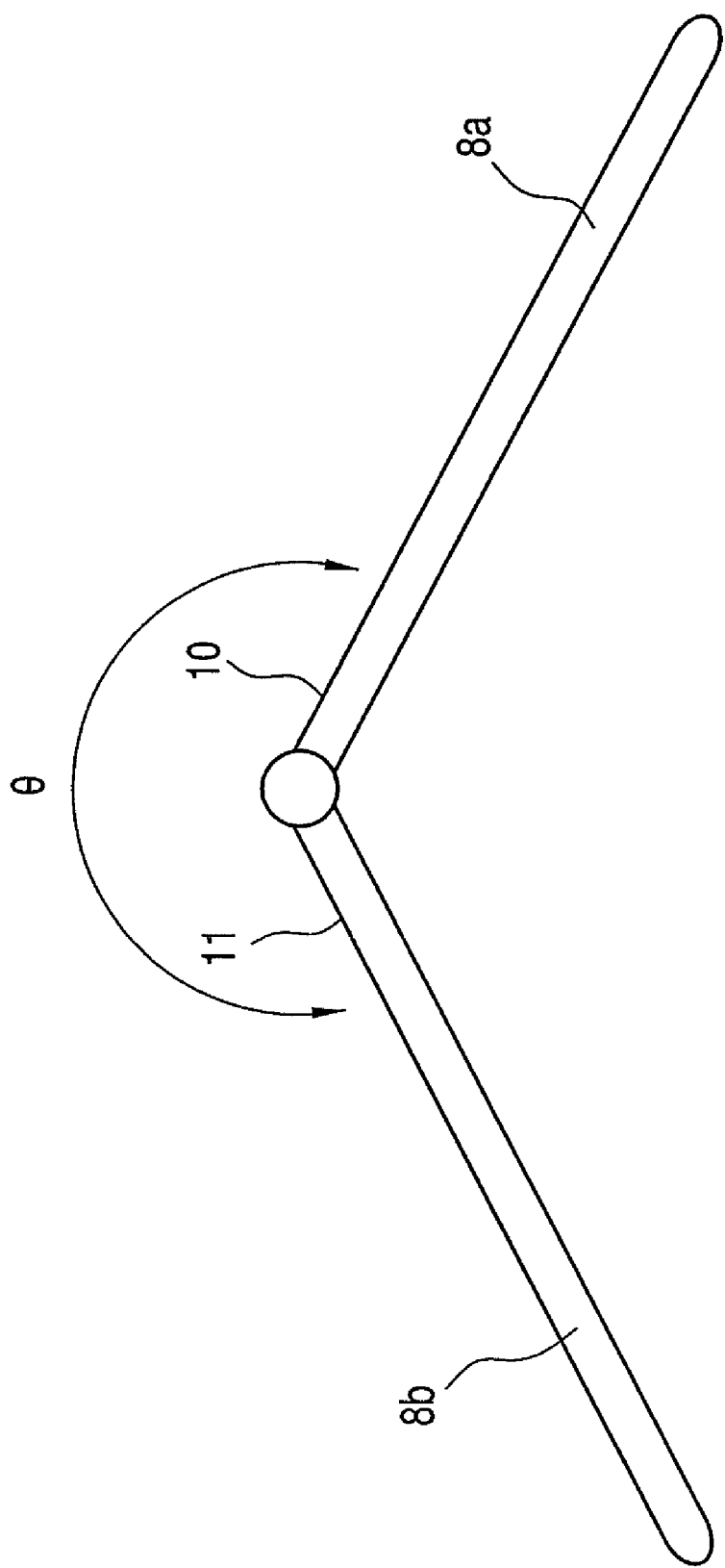
FIG. 9 illustrates a degree of rotation allowed between two modular constituent unmanned aerial vehicles following hard docking of their aerodynamic lifting structures according to an embodiment of the present invention.

According to an exemplary embodiment, the angle through which first and second wing panel tips 10-11 can rotate, θ, is between about 110° to about 255°. According to a further exemplary embodiment, angle θ ranges between about 90° to about 270°. FIG. 9 illustrates first wing panel tip 10 and second panel tip 11 when so rotated.

Following hard docking, wing panels 8a, b are joined together and form a single unitary lifting wing panel surface, and first and second airfoil adjustment mechanisms 6, 7 have been returned to their normal operative state(s). Manual, autonomous, or a combination of manual and autonomous control can be used to adjust first and second airflow adjustment mechanisms 6, 7 (as well as other first and second airflow adjustment mechanisms 6, 7) according to exemplary embodiments.

Figure 6:
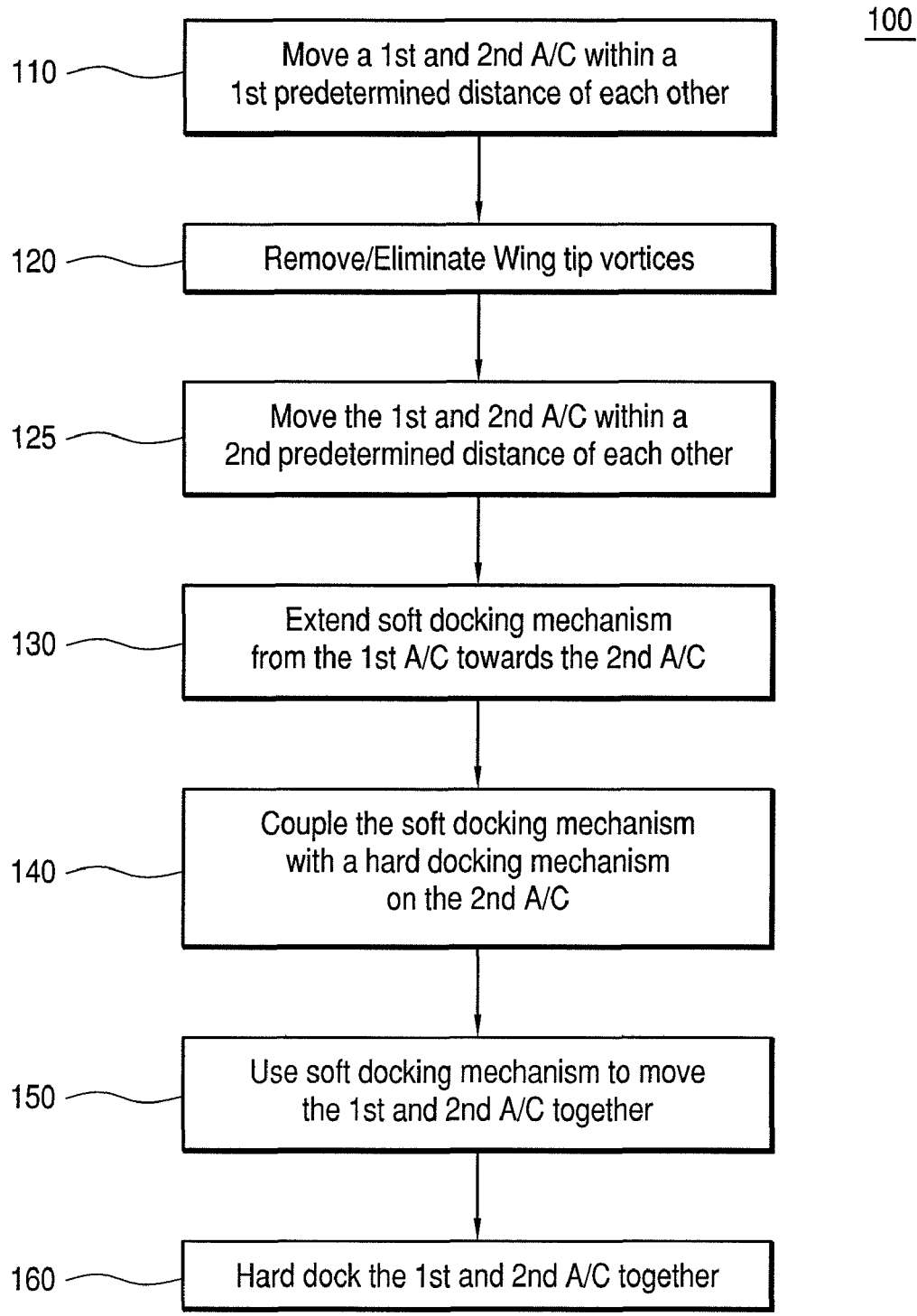
FIG. 6 is a flow diagram of method for coupling a first aircraft with a second aircraft according to an embodiment of the present invention.

FIG. 6 is a flow diagram of method 100 for coupling a first aircraft with a second aircraft according to an exemplary embodiment. Method 100 begins with step 110. In step 110, a first and second aircraft are moved within a first predetermined distance of each other. According to an exemplary embodiment, the first predetermined distance is a distance about equal to or less than the length of the first or second aircraft. According to another exemplary embodiment, the first predetermined distance is a distance about equal to or less than a length of a wingspan of the first or second aircraft. According to another exemplary embodiment, the first predetermined distance is a distance about equal to or less than half the length of a wing span of the first or second aircraft. According to still a further exemplary embodiment, the first predetermined distance is about equal to or less than the distance of soft docking mechanism 14. At the first predetermined distance, it can take a relatively short period of time for first and second MC UAV 2a, 2b to move together to couple their respective wing panels 8a and 8b. In step 120, wingtip vortices are substantially eliminated or reduced. The reduction and/or elimination of wing tip vortices is accomplished by reducing or removing lift at the wing tips, by altering the airflow configuration in the wing tip area. The substantial elimination or reduction of lift is accomplished by altering or changing the airflow over the wing tip area through use of an airflow adjustment mechanism 7. According to an exemplary embodiment, the airflow adjustment mechanism can be a flap, aileron, flaperon, or any other device known to those of ordinary skill in the art that can alter airflow around the wingtip area of the aircraft.

In step 125, which is an optional step, the first and second aircraft are moved within a second predetermined distance of each other. According to a further exemplary embodiment, the second predetermined distance can be any of the first predetermined distances discussed and defined above. Further still, the second predetermined distance can be a distance equal to or less than a chord length of either wing of the first and second aircraft.

In step 130, soft docking mechanism 14 is extended from the first aircraft (presumed to be in front of, or "fore", of the second aircraft (which is "aft" of the "fore" aircraft)). Soft docking mechanism 14 can operate within a volume of space referred to as soft docking cone 20; this represents the safe travel limits of soft docking mechanism 14. In step 140, soft docking mechanism 14 is received by second hard docking mechanism 18 on the second aircraft. The two aircraft are now coupled together and can proceed to move closer together in the absence of any wingtip vortices. Soft docking mechanism 14 retracts and causes the first and second aircraft to move together (step 150).

In step 160, first hard docking mechanism 16 hard docks with second hard docking mechanism 18, thereby hard docking the first and second aircraft together via their respective wingtips. A new aircraft now exists as long as the two (or more) wing panels are coupled together. Additional aircraft can be docked with the first two, and so on. As discussed above, according to a preferred embodiment, the aircraft are MC UAVs 2.

Figure 10:
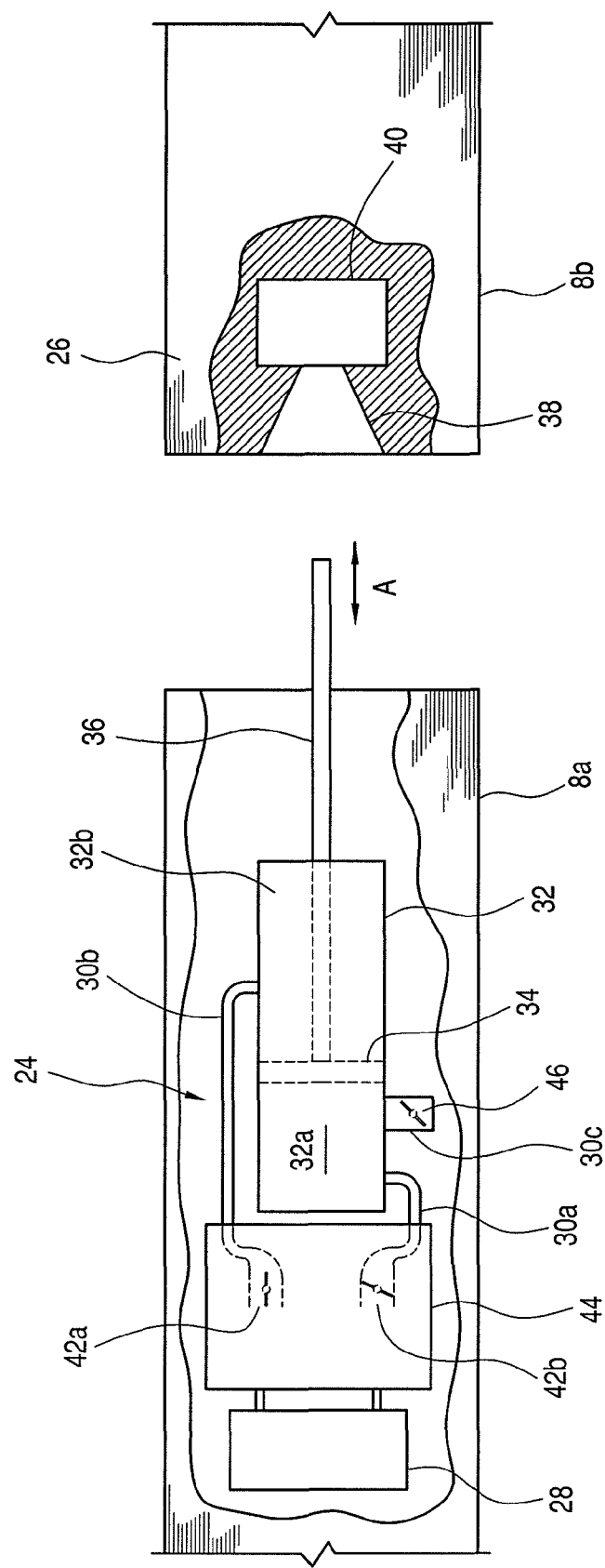
FIG. 10 illustrates a side view of a simplified view of a hard docking system according to an alternate embodiment of the present invention.
Figure 11:
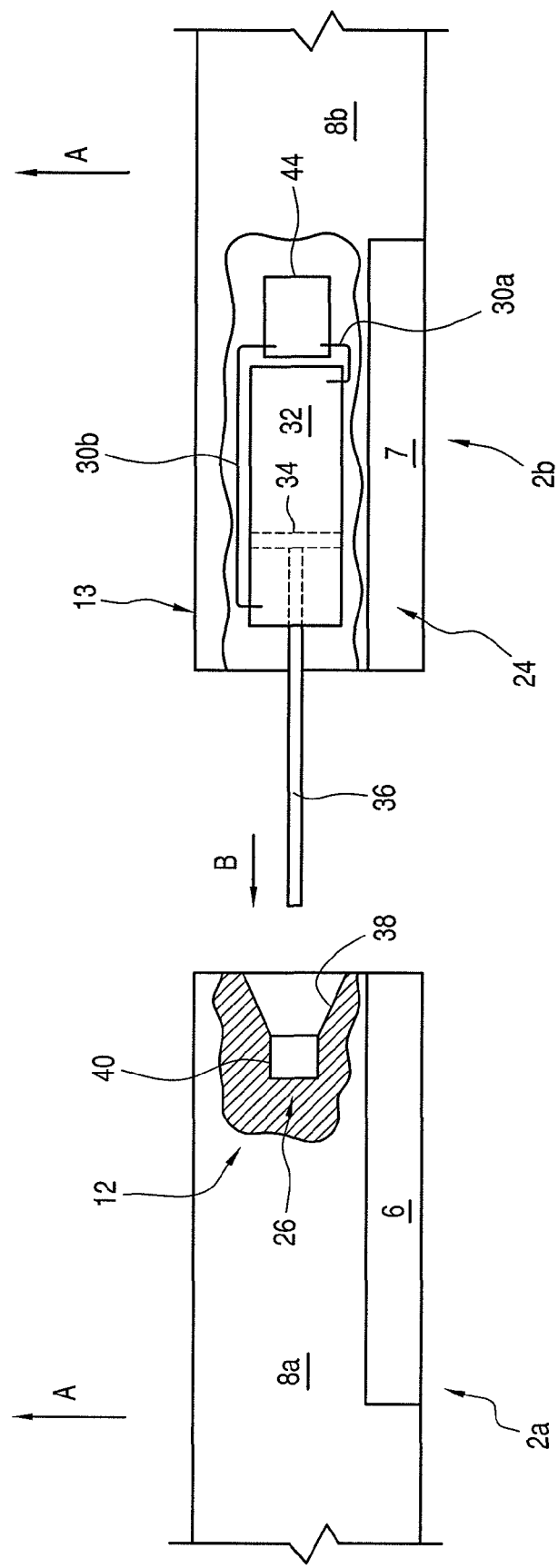
FIG. 11 illustrates a top cut-away view of the hard docking system shown in FIG. 10 within two modular constituent unmanned aerial vehicles as they become hard docked with each other according to an embodiment of the present invention.

According to an exemplary embodiment, use of soft docking mechanisms 14 is optional and need not be used at all. With high precision control systems on both aircraft (i.e., MC UAV 2), the second aircraft could be flown directly into a hard dock connection. With yet another exemplary embodiment, use of soft docking mechanisms 14 is optional and need not be used at all, especially in view of an alternate hard docking system, shown in FIGS. 10, 11 and 12. FIG. 10 illustrates a side view of a simplified view of a hard docking system according to an alternate embodiment, and FIG. 11 illustrates a top cut-away view of the hard docking system shown in FIG.

Figure 12:
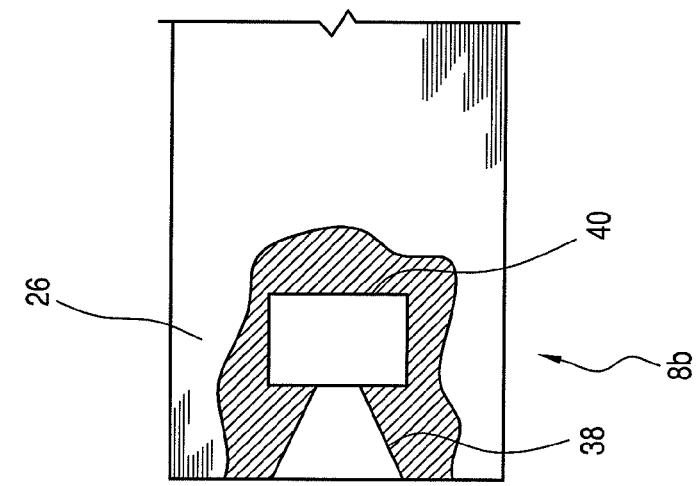
FIG. 12 illustrates a side view of a simplified view of a hard docking system according to a further alternate embodiment of the present invention.
Figure 12:
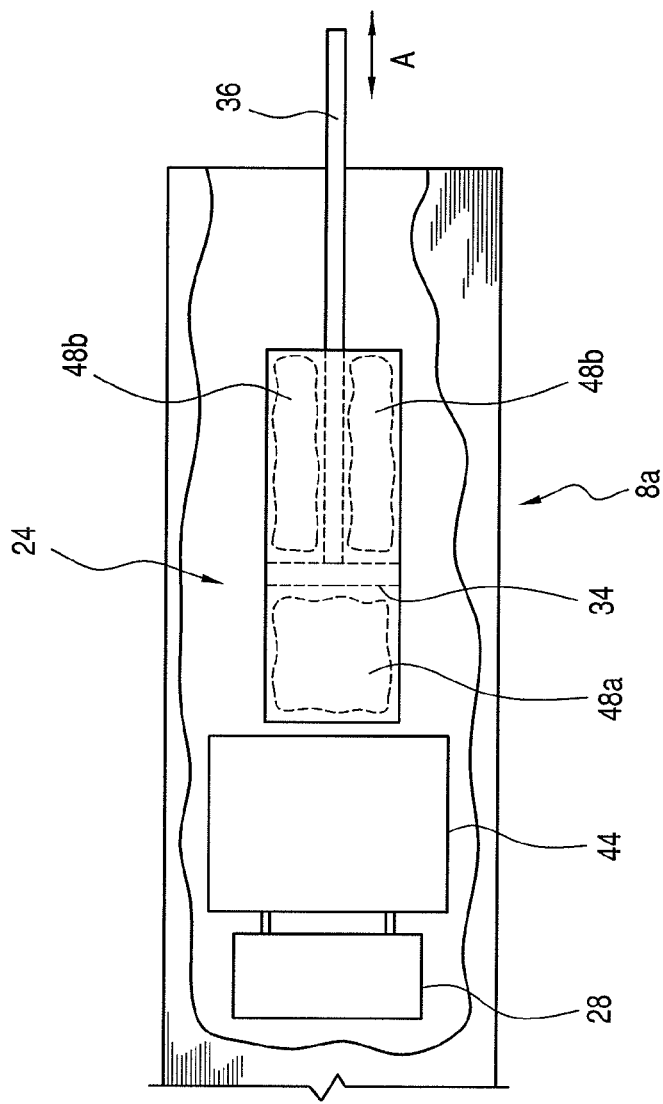

10 within two modular constituent unmanned aerial vehicles as they become hard docked with each other according to an exemplary embodiment. FIG. 12 illustrates a side view of a simplified view of a hard docking system according to a further alternate embodiment of the present invention.

In FIG. 10, third hard docking mechanism 24 comprises (optionally) pump(s) 28, piston 34 that is attached to flexible rod (rod) 36, piston reservoir 32, and fluid reservoir 44. According to a preferred embodiment, pump(s) 28 are used to pressurize fluid reservoir 44 (which can also be pressurized using alternate means). Fluid reservoir 44, which then contains pressurized fluid, releases pressurized fluid into and out of reservoir 32, causing piston 34 and rod 36 to extend and retract (as shown by arrow A) from reservoir 32. Valves 42a and 42b can alternately open and close to allow pressurized fluid to flow into and out of piston reservoir portions 32a, and 32b, thereby alternately extending and retracting piston 34 and rod 36. As those of ordinary skill in the art can appreciate, valves 42a, and 42b can be a single valve, or multiple valves. According to an alternate embodiment, pump(s) 28 can pump fluid directly into and out of piston reservoir portions 32a and 32b. However, pressurizing the fluid in a fluid reservoir will result in a faster response time for extending and retracting piston 34 and rod 36 then using pumps 28 to pump the fluid directly. According to a preferred embodiment, if piston 34 was located at the left-most position within reservoir 32, such that rod 36 was completely or nearly completely retracted within wing panel 8a, pressurized fluid can be released into reservoir portion 32a, and out of reservoir portion 32b, thereby driving piston 34 and rod 36 out to the right towards fourth hard docking mechanism 26. The fluid stored in piston reservoir 32 can be a hydraulic fluid, or a gas, and piston 34 can be driven by many different mechanisms, including, but not limited to a screw, a servo mechanism, a magnetic drive, a ram-air drive-mechanism, among other types of drive means.

According to still a further exemplary embodiment, piston 34 and rod 36 can be driven by gas bags 48a, and 48b, as shown in FIG. 12. Inflating gas bag 48a drive piston 34 and rod 36 out, thereby extending rod 36 such that it approaches fourth hard docking mechanism 26. Simultaneously, if gas bag 48b was left inflated, it would need to be concurrently deflated. Preferably, however, once piston 34 and rod 36 are driven in the desired direction by inflating the appropriate gas bag 48, it is partially or completely deflated. To retract piston 34 and rod 36, gas bag 48b is inflated, thereby driving piston 34 and rod 36 to the left, away from fourth hard docking mechanism 26. The inflation and deflation of gas bags 48a, and 48b occurs in substantially the same manner as the transfer of fluid as described above in regard to FIGS. 10 and 11, and encompasses the same alternative embodiments described before. Fluid lines 30a, b and valves 42a, b have been omitted from FIG. 12 for the purposes of brevity and clarity.

Fourth hard docking mechanism 26, as part of wing panel 8b in a second MC UAV 2, comprises rod guide 38, and gripper 40. Control of third and fourth hard docking mechanisms can be nearly completely or totally autonomous, controlled by an airborne or ground located computer system, that utilizes optical or other proximity sensors to realize when the two MC UAV's 2 and their respective wing panels 8 are properly aligned. Once wing panel 8a and 8b are properly aligned and within a first predetermined distance of each other, third hard docking mechanism 24 drives rod 36 out towards fourth hard docking mechanism 28, and into rod guide 38 which is preferably conically shaped to accept flexible rod 36. This type of aperture is well known to those of ordinary skill in the art. When rod 36 enters rod guide 38 and encounters gripper 40, gripper 40 clamps onto rod 36; the control system for third and fourth hard docking mechanisms 24, 26 senses the gripping, and alerts pump(s) 28 of third hard docking mechanism 24 to pump the fluid such that rod 36 is retracted into third hard docking mechanism 24. According to a preferred embodiment, rod 36 is forced back into third hard docking mechanism through the operation of pressurized fluid (described above, or via operation of gas bag(s) 48a, b) This causes the first and second aircraft, MC UAV 2a, b to come together at their respective wing tips of wing panels 8a, b, hard docking them together. An additional clamp or locking mechanism, not shown, can further lock the two wings panels 8a, b together, thereby forming an integrated UAV. As those of ordinary skill in the art can appreciate, this process can be repeated for additional MC UAVs 2, forming a much larger aircraft. According to still a further exemplary embodiment, alternative hard docking systems can operate when wing panels 8a, 8b are vertically stacked, instead of being horizontally opposed.

According to still a further embodiment of the present invention, docking cushion valve 46 can be inserted in fluid line 30c, which is attached to piston reservoir portion 32a. As piston 34 and rod 36 are extended from third docking mechanism 24 and encounter gripper 40 of fourth docking mechanism 26, considerable force can be expected to be generated that normally would have to be accepted by gripper 40, and then transferred to wing panel 8b and the second aircraft. According to an exemplary embodiment, however, docking cushion valve 46 can be used to partially or fully open just as rod 46 encounters gripper 40 (through the appropriate use of force feedback sensors) thereby relieving some of the pressure in fluid reservoir portion 32a, which reduces the force that rod 36 imparts upon gripper 34 (when the two aircraft (MC-UAVs 2a, 2b) initiate a hard dock)

According to still a further embodiment of the present invention, as the two aircraft are pulled together and join wing-tip to wing-tip, docking cushion valve 46 can operate to relieve still more fluid pressure in fluid reservoir portion 32a. According to a preferred embodiment, one preferred example of MC UAV 2a, 2b weighs about 3000 pounds. As the two 3000 pound aircraft are pulled and hard docked together by operation of rod 36 being retracted back into third hard docking mechanism 24 (as discussed above), there is a substantial amount of force generated. Preventing or substantially reducing the impact force through use of docking cushion valve 46 can extend the service life of the aircraft, and substantially prevent damaging collisions.

According to still a further exemplary embodiment, when undocking two docked aircraft (MC UAV's 2a, b), third and fourth hard docking mechanisms 24, 26 (using in any of the embodiments discussed above), can be used to rapidly force the aircraft apart, minimizing the chances of a collision between them. When the two aircraft are ready to be undocked, fourth docking mechanism 26 causes gripper 40 to release rod 36, and third docking mechanism 24 again extends piston 36 thereby forcing the two aircraft apart. Third docking mechanism 24 then retracts piston 34 and rod 36 within the aircraft.

According to a preferred embodiment, autonomous docking of two (or more) MC UAVs 2 can be achieved through the innovative use of precision flight guidance and robotics. The docking sequence can be further described as below: A second MC UAV 2b climbs to an initial approach position (IAP). The IAP is in-trail behind a first MC UAV 2a and off to the side so that the wingtips of both first and second MC UAV's are aligned. The outboard trailing edge flaps on each wing are reflexed to eliminate the wing lift and move the tip vortex inboard to reduce aerodynamic interaction between the first and second MC UAVs 2a, b.

MC UAV 2b moves forward, within range of the soft docking mechanism (docking probe), and the docking probe on MC UAV 2a robotically extends and aligns with the docking port on the MC UAV 2b. According to an exemplary embodiment, a vision-based guidance system enables the docking probe on MC UAV 2a to enter and lock into MC UAV 2b. At this point, MC UAV's 2a, b are 'soft docked'. Fine relative control between MC UAV 2a, b is accomplished through force feedback of the docking probe with the docking port on the MC UAV 2b. The docking probe on MC UAV 2a is retracted back and force feedback from the docking port on the MC UAV 2b is used to fly MC UAV's 2a, b, together.

A force feedback system entails a system of sensors that can measure forces on soft docking mechanism 14 as it is attached to second MC UAV b, and second docking mechanism 18. The force feedback system provides force measurement data to a central flight guidance system (CFGS). Based on the force measurements, the CFGS adjusts trim, power and airfoils on one or both of first and second MC UAV's 2a, b to obtain force measurement signals that indicate that first and second MC UAV 2a, b are moving towards each other at the appropriate attitude, attitude and speed.

Once MC UAV 2b is flown up to and docked with MC UAV 2a, the intra-vehicle hinge (hard docking mechanism) is engaged and is used to provide control torques between the attached MC UAVs 2a, b (now air vehicle 100) during flight operations.

All of the above described operations for altering the configuration of the airfoil to substantially reduce or eliminate wingtip vortices, extension of and/or retraction of soft docking mechanism 14, soft docking, hard docking, can occur manually, autonomously, or via a combination of both automated and manual operations.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. An aerodynamic lifting structure docking mechanism for docking together two or more aircraft, comprising:
   an aerodynamic lifting structure, wherein the aerodynamic lifting structure includes
      a first end area and a second end area,
      a first airflow adjustment mechanism and a second airflow adjustment mechanism, wherein
         the first airflow adjustment mechanism is located at the first end area of the aerodynamic lifting structure, and
         the second airflow adjustment mechanism is located at the second end area of the aerodynamic lifting structure,
      a first hard docking mechanism, wherein
         the first hard docking mechanism is located at a tip area of the first end area of the aerodynamic lifting structure, and
      a second hard docking mechanism, wherein
         the second hard docking mechanism is located at a tip of the second end area of the aerodynamic lifting structure, and wherein,
         the first airflow adjustment mechanism and the second airflow adjustment mechanism are configured to substantially move any aerodynamic lifting structure air vortices existing around each of the aerodynamic lifting structure tip areas away from each respective aerodynamic lifting structure tip area, and further wherein
         the first hard docking mechanism and the second hard docking mechanism are configured to hard dock with each other, thereby docking a first aerodynamic lifting structure of a first aircraft with a second aerodynamic lifting structure of a second aircraft.

2. The aerodynamic lifting structure according to claim 1, further comprising:
   a soft docking mechanism, wherein
      the soft docking mechanism is located at the first hard docking mechanism, and further wherein
      the soft docking mechanism is configured to soft dock the first aerodynamic lifting structure with the second aerodynamic lifting structure when the first aerodynamic lifting structure and the second aerodynamic lifting structure are within a predetermined distance of each other.

3. The aerodynamic lifting structure according to claim 2, wherein the soft docking mechanism is further configured to be extendable and retractable.

4. The aerodynamic lifting structure according to claim 2, wherein the soft docking mechanism comprises a boom assembly.

5. The aerodynamic lifting structure according to claim 2, wherein the predetermined distance is less than or about the length of the first aircraft.

6. The aerodynamic lifting structure according to claim 2, wherein the predetermined distance is less than or about the length of the first aerodynamic lifting structure of the first aircraft.

7. The aerodynamic lifting structure according to claim 2, wherein the predetermined distance is less than or about half the length of the first aerodynamic lifting structure of the first aircraft.

8. The aerodynamic lifting structure according to claim 1, wherein the aerodynamic lifting structure comprises:
   a first wing on a first side of a fuselage of the first aircraft; and
   a second wing on a second side of the fuselage.

9. The aerodynamic lifting structure according to claim 1, wherein the aerodynamic lifting structure comprises a mono wing aircraft, with no fuselage separating the wing structure.

10. The aerodynamic lifting structure according to claim 1, wherein
   the first airflow adjustment mechanism is configured to alter a surface configuration of the first end area of the aerodynamic lifting structure, and is thereby further configured to alter airflow over the first end area, and
   the second airflow adjustment mechanism is configured to alter a surface configuration of the second end area of the aerodynamic lifting structure, and is thereby further configured to alter airflow over the second end area.

11. The aerodynamic lifting structure according to claim 1, wherein the aircraft is a solar powered aircraft.

12. The aerodynamic lifting structure according to claim 1, wherein
the first hard docking mechanism includes a gripper portion, and
the second hard docking mechanism includes a controllable piston portion and a flexible rod, and wherein,
the controllable piston portion is configured to extend the flexible rod from the first aerodynamic lifting structure towards the gripper portion, and
the gripper portion is configured to grip the flexible rod, and
the controllable piston portion is further configured to retract the gripped flexible rod, thereby hard docking the first aircraft with the second aircraft.

\* \* \* \* \*